(12) United States Patent
Anand et al.

(10) Patent No.: US 10,519,050 B2
(45) Date of Patent: Dec. 31, 2019

(54) METHOD FOR FRYER STACK RECOVERY AND TREATMENT

(71) Applicant: Frito-Lay North America, Inc., Plano, TX (US)

(72) Inventors: Ashish Anand, Greenwich, CT (US); Siva Kumar Kota, Bangalore (IN); Rravindar Verma, Haryana (IN)

(73) Assignee: Frito-Lay North America, Inc., Plano, TX (US)

( * ) Notice: Subject to any disclaimer, the term of this patent is extended or adjusted under 35 U.S.C. 154(b) by 257 days.

(21) Appl. No.: 15/663,282

(22) Filed: Jul. 28, 2017

(65) Prior Publication Data

US 2019/0031541 A1    Jan. 31, 2019

(51) Int. Cl.

| | |
|---|---|
| *C02F 1/32* | (2006.01) |
| *C02F 1/44* | (2006.01) |
| *C02F 1/72* | (2006.01) |
| *C02F 9/00* | (2006.01) |
| C02F 101/38 | (2006.01) |
| C02F 103/32 | (2006.01) |

(52) U.S. Cl.
CPC ............ *C02F 1/722* (2013.01); *C02F 9/00* (2013.01); *C02F 1/32* (2013.01); *C02F 1/441* (2013.01); *C02F 1/444* (2013.01); *C02F 2101/38* (2013.01); *C02F 2103/32* (2013.01); *C02F 2305/026* (2013.01)

(58) Field of Classification Search
CPC .. C02F 1/32; C02F 1/441; C02F 1/444; C02F 1/722; C02F 9/00; C02F 2101/38; C02F 2103/32; C02F 2305/026
See application file for complete search history.

(56) References Cited

U.S. PATENT DOCUMENTS

| | | |
|---|---|---|
| 4,226,673 A | 10/1980 | Fremont |
| 6,491,797 B1 | 12/2002 | Locke et al. |

(Continued)

FOREIGN PATENT DOCUMENTS

| | | |
|---|---|---|
| WO | 2013044168 A1 | 3/2013 |
| WO | 2014066931 A1 | 5/2014 |

OTHER PUBLICATIONS

Kobya et al., "Treatment of potato chip manufacturing wastewater by electrocoagulation," Desalination 190 (2006) 201-211 (Year: 2006).*

(Continued)

*Primary Examiner* — Lucas A Stelling
(74) *Attorney, Agent, or Firm* — Brandon V. Zuniga; Colin P. Cahoon; Carstens & Cahoon, LLP

(57) ABSTRACT

A method for reducing the amount of acrylamide in recovered water from a fryer stack. This invention provides a method to treat acrylamide in the waste water/process water. Organic compounds such as phenols, acrylamide and phenolic compounds can be oxidized in the presence of oxidizing compounds like hypo and Fenton reagent. Fenton reagent is a product of reaction of Iron Salts (like Ferrous Sulphate-$FeSO_4$) and Hydrogen Peroxide ($H_2O_2$). It generates $OH*$ (radical) which has significantly more oxidation power compared to traditional oxidizing agents such as Chlorine. The fryer stack water is collected and treated using Fenton reagent such that the Acrylamide levels are reduced to less than 0.1 ppb in the recovered water.

19 Claims, 3 Drawing Sheets

(56) References Cited

U.S. PATENT DOCUMENTS

| | | |
|---|---|---|
| 6,582,605 B2 | 6/2003 | Krulik |
| 2005/0112735 A1* | 5/2005 | Zappi .................. C02F 1/26 |
| | | 435/134 |
| 2015/0166383 A1* | 6/2015 | Visnja .................. C02F 1/001 |
| | | 205/752 |
| 2016/0068417 A1* | 3/2016 | Buschmann ............ C02F 1/281 |
| | | 210/663 |
| 2016/0200605 A1 | 7/2016 | Safarzdeh-Amiri |
| 2017/0121200 A1 | 5/2017 | Brozell |

OTHER PUBLICATIONS

Krzeminska et al., "Advanced oxidation processes for food industrial wastewater decontamination," Journal of Ecological Engineering, vol. 16, Is. 2, Apr. 2015, pp. 61-71. (Year: 2015).*
PCT Search Report and Written Opinion for PCT/US18/41457 dated Oct. 1, 2018 (7 pages).

* cited by examiner

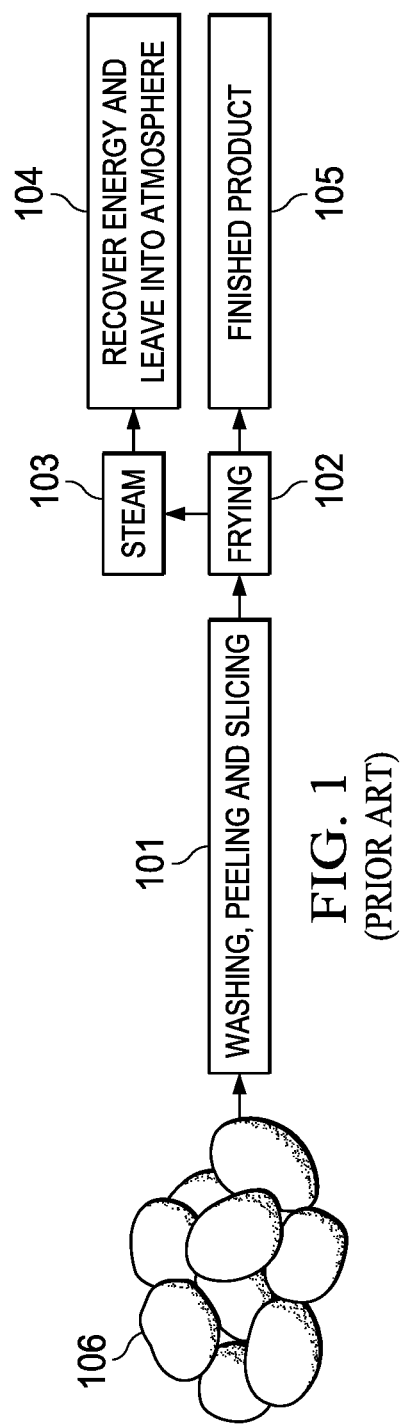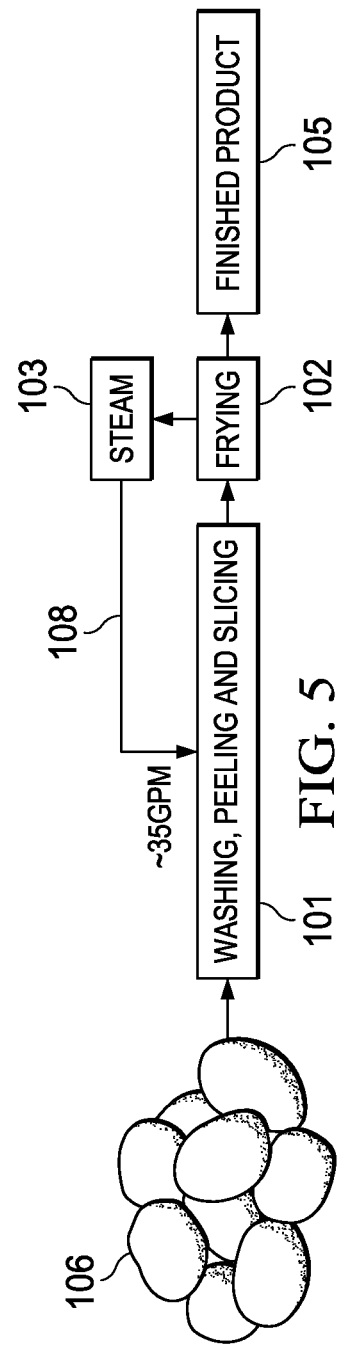

METHOD FOR FRYER STACK RECOVERY AND TREATMENT

BACKGROUND OF THE INVENTION

Technical Field

The present invention relates to a method for reducing and removing the amount of Acrylamide in the water released as steam from the frying of tubers such as potatoes, fryer stack water recovery and treatment, wastewater, water sustainability, and water reuse. This invention permits the recovery of fryer stack water having significantly reduced levels of acrylamide.

Description of Related Art

The chemical acrylamide has long been used in its polymer form in industrial applications for waste water treatment, enhanced oil recovery, papermaking, flocculants, thickeners, ore processing and permanent-press fabrics. Acrylamide precipitates as a white crystalline solid, is odorless, and is highly soluble in water (2155 g/L at 30° C.). Synonyms for acrylamide include 2-propenamide, ethylene carboxamide, acrylic acid amide, vinyl amide, and propenoic acid amide. Acrylamide has a molecular mass of 71.08, a melting point of 84.5° C., and a boiling point of 125° C. at 25 mmHg.

Treating wastewater, process water and recovering at a high quality, reusing and recycling with in the process is a solution to water scarcity issues faced in many parts of the world. Potatoes typically contain approximately 80% of water by weight. As illustrated in FIG. 1, potatoes (106) are washed, peeled and sliced in a washer, peeler and slice operation block (101), fried in a fryer (102) and seasoned to produce a finished product (105). During frying process, water evaporates, which generates low pressure steam (103) along with volatile organic compounds. Steam generated can be condensed using different systems such as vapor absorption chillers and, condenser (104). The fryer stack water and excess steam is currently disposed and not recovered and reused. It has been found that the fryer water condensate shows the presence of Acrylamide and Phenolic compounds. An analysis of the fryer condensate shows that acrylamide levels are between 100 to 3000 ppb, which does not meet potability of water standards from quality standpoint. Therefore, there is a need for water recovery and treatment process from the potato which is contained in the potato to be used in the potato chip making process. There is also a need to recover the water coming from the frying operation as steam that can be reused in the process, after proper treatment, to meet drinking water guidelines such as USEPA and WHO drinking water standards The conventional water treatment systems typically include biological treatment processes, membrane processes, resin based technology, and/or ozonation/UV. However, such systems are expensive to install and operate and the methods will not treat acrylamide. Some of the issues affecting the cost and operation of these systems include fouling of the membranes, leading to higher operating pressure for the membrane systems and lower recoveries of treated water, and more frequent cleaning and replacement of the membranes. High cost of equipment and processes is also an issue with conventional water recovery systems. Acrylamide is highly hydrophilic in nature which makes it difficult to remove using conventional/membrane systems. These problems have limited the use of conventional systems. Therefore there is a need for a low cost and efficient system to treat recovered water and reduce acrylamide levels to less than 0.1 ppb.

Acrylamide has not been determined to be detrimental to humans, but its presence in food products or recovered water, especially at elevated levels, is undesirable. By way of example, FIG. 2 illustrates well known prior art methods for making fried potato chips from raw potato stock. The raw potatoes, which contain about 80% or more water by weight, are first washed and proceed to a peeling step 210. After the skins are peeled from the raw potatoes, the potatoes are then transported to a slicing step 220. The thickness of each potato slice at the slicing step 220 is dependent on the desired thickness of the final product. An example in the prior art involves slicing the potatoes to a thickness of about 0.04 to about 0.08 inches. These slices are then transported to a washing step 230, wherein the surface starch on each slice is removed with water. The washed potato slices are then transported to a cooking step 240. This cooking step 240 typically involves frying the slices in a continuous fryer at, for example, about 171° C. to about 182° C. (340-360° F.) for approximately two to three minutes. The cooking step generally reduces the moisture level of the chip to less than 2% by weight. For example, a typical fried potato chip exits the fryer with approximately 1-2% moisture by weight. The cooked potato chips are then transported to a seasoning step 250, where seasonings are applied in a rotation drum. Finally, the seasoned chips proceed to a packaging step 260. This packaging step 260 usually involves feeding the seasoned chips to one or more weighers which then direct chips to one or more vertical form, fill, and seal machines for packaging in a flexible package. Once packaged, the product goes into distribution and is purchased by a consumer.

Referring back to FIG. 2, a fabricated potato chip does not require the peeling step 210, the slicing step 220, or the washing step 230. Instead, fabricated potato chips may start with a dehydrated potato product such as potato flakes. The dehydration of potatoes releases water which is disposed of and not recovered and reused. There is a need to recover the water from the dehydration process. The dehydrated potato product is mixed with water and other minor ingredients to form dough. This dough is then sheeted and cut before proceeding to a cooking step. The cooking step may involve frying or baking. The chips then proceed to a seasoning step and a packaging step.

It would be desirable to develop one or more methods of reducing the level of acrylamide in the recovered water from a fryer stack, washing and peeling operation, and a dehydration unit operation. Ideally, such a process should substantially reduce or eliminate the acrylamide in the recovered water while making the water potable. Further, the method should be easy to implement and, preferably, add little or no cost to the overall process.

SUMMARY OF THE INVENTION

The invention provides a method to treat acrylamide in waste water/process water. Organic compounds such as phenols and phenolic compounds can be oxidized in the presence of oxidizing compounds like hypo and Fenton reagent. Fenton reagent is a product of reaction of Iron Salts (like Ferrous Sulphate-$FeSO_4$) and Hydrogen Peroxide ($H_2O_2$). It generates OH* (radical) which has significantly more oxidation power compared to traditional oxidizing agents such as Chlorine. The fryer stack water is collected and treated using Fenton reagent such that the Acrylamide levels are reduced to less than 0.1 ppb in the recovered water.

The above, as well as additional features and advantages of the invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 1 is a prior art process flow illustrating generation of steam from a fryer stack.

FIG. 5 is an exemplary water reuse process flow chart according to an embodiment of the present invention.

DETAILED DESCRIPTION OF THE INVENTION

The present idea includes an innovative way to treat acrylamide in the waste water/process water. Organic compounds such as acrylamide, phenols and phenolic compounds can be oxidized in the presence of oxidizing compounds like hypo, Fenton reagent, etc. Fenton reagent is a product from the reaction of Iron Salts (like Ferrous Sulphate-$FeSO_4$) and Hydrogen Peroxide ($H_2O_2$). It generates OH* (radical) which has significantly more oxidation power compared to traditional oxidizing agents such as Chlorine. The reaction works across a broad range of pH and temperatures. According to a preferred exemplary embodiment, highest kinetics can be achieved at a pH between 3 and 6 and temperature ranges between 20° C. and 30° C. Equation (1) as in the reaction mechanism shown below illustrates the oxidation of acrylamide with an OH* radical producing $CO_2$, CO, $NH_3$, $NO_2$, $NO_3$, and $H_2O$ as byproducts.

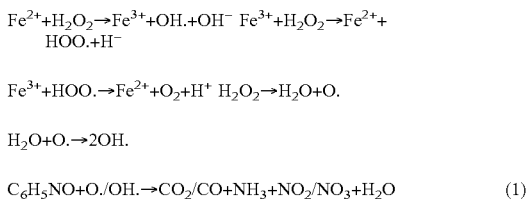

The fryer stack water may be collected and treated using Fenton reagent. The levels of acrylamide may be reduced by more than 99% in the water. The experiment may be conducted in a lab with waste water samples collected from a unit operation such as a fryer stack located in a manufacturing plant. Base analysis may be conducted to establish contaminants levels. Reagents Ferrous sulphate and Hydrogen Peroxide at different concentration levels may be prepared for the experiments. Preliminary filtration of the waste water may be done using micro/ultra filtration. The filtered water sample may then be treated with Fenton Reagent ($FeSO_4$ & $H_2O_2$) and held in the reactor before passing it through activated carbon filter ("ACF"). ACF treated water may be used to measure acrylamide in the treated sample. According to an exemplary embodiment, the Fenton reagent reduces the Acrylamide levels by greater than 99% in the water and in some instances greater than 99.9%. It should be noted the process is simple with few reagents. The process is replicable and reproducible. The simpler process of fewer reagents enables building a lower cost system as compared to conventional treatment systems.

Figure 2:
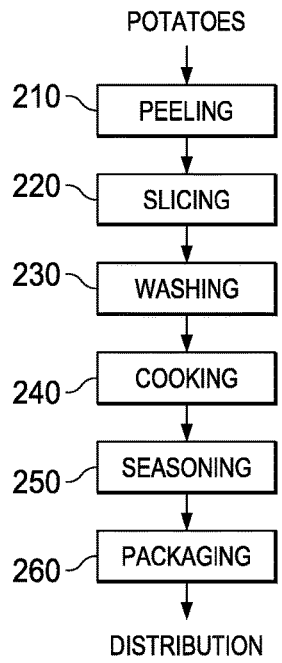
FIG. 2 is a schematic of prior art potato chip processing steps.

These results demonstrate an ability to modify one or more unit operations in any given prior art process for making a food product so that the resulting treated water comprises reduced concentration of acrylamide (<0.1 ppb). "Reduced concentration of acrylamide" means a concentration of acrylamide in the final treated water that is lower than the concentration of acrylamide directly taken from a unit operation such as a fryer stack. The terms "reduced concentrations of acrylamide," "reduced acrylamide concentration," and "reduced acrylamide level" are all used interchangeably in this application. For the purpose of this application, "unit operations" means a definable segment of an overall method for producing a food product. For example, referring to FIG. 2, each one of the potato chip processing steps (the peeling step 210, the slicing step 220, the washing step 230, the cooking step 240, the seasoning step 250, and the packaging step 260) is considered a separate unit operation with regard to the overall process of producing a potato chip food product. For the purpose of this application, "waste water", "recovered water", or "recovered waste water" means water directly taken or recovered from a unit operation such as a fryer stack. For the purpose of this application, "treated water", "treated recovered water", or "treated waste water" means water generated from reaction of waste water with a Fenton reagent.

A first example of the manipulation of a unit operation involves the washing step 230 (illustrated in FIG. 2) of potato chips produced by slicing raw potato stock. The prior art method of washing slices involves rinsing the chips with water at room temperature. The average residence time of each chip in this water rinse in the prior art is typically less than about 60 seconds, depending on the equipment used.

Figure 3:
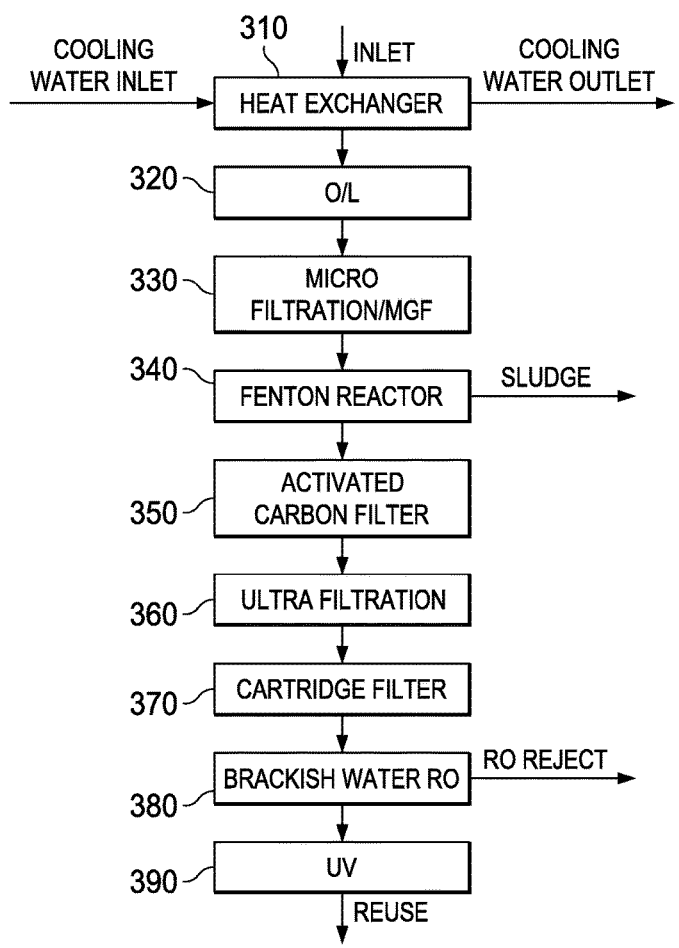
FIG. 3 is an exemplary water recovery and treatment system according to an embodiment of the present invention.

FIG. 3 illustrates an exemplary water recovery and treatment system according to an embodiment of the present invention. The system (300) may include a heat exchanger (310) to reduce process temperatures of steam condensate received from a unit operation such as a fryer stack. The waste water or steam condensate may be taken directly from the fryer or as a byproduct from a vapor absorption chiller (not shown). The fryer condensate from the chiller or directly from the fryer may be fed to an inlet of the heat exchanger (310). The temperature of the fryer condensate is reduced by exchange of heat with cooling water. The temperature of the condensate may be reduced from a range of 85° C.-90° C. to a range of 25° C. to 30° C. Output condensate from the heat exchanger (310) may be processed through an oil and grease removal unit (320) using conventional technologies like Oil Skimmer/API/DAF or membrane systems like MW series membrane or equivalent. A multi grade filter may also be used to remove suspended solids (TSS). Subsequently, the waste water from the unit (320) is processed through a microfiltration unit (330) to remove suspended solids. The waste water substantially free of oil and grease and suspended solids is then input to a Fenton reactor (340) where acrylamide and Phenolic compounds are removed or reduced through oxidation process. The treated water byproduct from the reaction is then passed through an activated carbon filter (350) to remove color and other organics. Thereafter, the treated water may be filtered with ultra filtration (360) to remove or reduce suspended solids and turbidity. The treated water may then be passed through cartridge filters (370) to remove or reduce micron size particles and to protect reverse osmosis (RO). A reverse osmosis (380) may then be performed on the treated water to remove or reduce dissolved solids. The treated water may then be disinfected using ultra violet (UV) (390) exposure. The treated water from the UV may then be reused in the manufacturing process for various unit operations such as washing, peeling, chilling, heat exchanger and any other unit operations requiring water. Reverse Osmosis (RO) treated water may be used as a cooling medium in a cooling tower or other cooling equipment. The treated water may also be used as a boiler feed water in a boiler. Table 1.0 as shown below demonstrates the reduction of acrylamide levels as the waste water is recovered and treated. As clearly shown, the acrylamide levels have been reduced from 1500 ppb in the fryer stack recovered water to less than 0.1 ppb after the Fenton reaction and after ACF in the final treated water. Table 1.0 shows the Acrylamide levels reduced to 1450 ppb with standard filtering methods (Water C1). Water C2-C6 are treated with different volumes of 5% $FeSO_4$ and 30% $H_2O_2$. It has been demonstrated that 5 ml of 5% $FeSO_4$ and 1.5 ml of 30% $H_2O_2$ was the optimal for this particular experiment. However, other concentrations and volumes of 5% $FeSO_4$ and 30% $H_2O_2$ may be used to obtain optimal reduction in Acrylamide levels. The 5% $FeSO_4$ and 30% $H_2O_2$ may be added to the Fenton reactor in-situ (at the same time) or separately. In-situ addition enables the OH radical to be available instantly for oxidation of the phenols and phenolic compounds in the fryer stack condensate. The Fenton reagent is effective in reducing most of the organics like phenols, bis phenols, poly aromatic hydrocarbons and pesticides etc. It should be noted that the $FeSO_4$ in the Fenton reagent may be commonly available in the FeSO4.xH2O form where x=1 to 10. In a more preferred embodiment $FeSO_4.7H_2O$ may be used. In other embodiments, Ferric Sulphate ($Fe_2(SO_4)_3$) may also be used in the Fenton reagent.

TABLE 1.0

| VAM water from Plant A | 5% $FeSO_4$, ml | 30% $H_2O_2$, ml | Acrylamide Levels After ACF |
|---|---|---|---|
| Water C1 | | | 1450 ppb |
| Water C2 | 15.0 | 2.5 | <0.1 ppb |
| Water C3 | 10.0 | 2.0 | <0.1 ppb |
| Water C4 | 5.0 | 1.5 | <0.1 ppb |
| Water C5 | 2.5 | 1.0 | 2.2 ppb* |
| Water C6 | 2.0 | 0.5 | 10 ppb* |

Table 2.0 as illustrated below shows the reduction of acrylamide for different samples by greater than 99%. The level of acrylamide in the final treated water is less than 0.5 ppb. According to a preferred exemplary embodiment, the percentage reduction of acrylamide levels from the waste water to the treated water is greater than 99.6%. According to another exemplary embodiment, the level of acrylamide in the final treated water is less than 1 ppb. According to a more exemplary embodiment, the level of acrylamide in the final treated water is less than 0.5 ppb. According to most exemplary embodiment, the level of acrylamide in the final treated water is less than 0.1 ppb.

TABLE 2.0

| Water Parameters | Fryer Stack Water | Water treated with Fenton Reagent | Treated water after ACF |
|---|---|---|---|
| Acrylamide, ppb | 1378 | 18.98 | 0.6 |
| | 182 | 0.5 | <0.5 |
| | 159 | 0.5 | <0.5 |
| | 122 | 0.5 | <0.5 |
| | 172 | 0.5 | <0.5 |

Figure 4A:
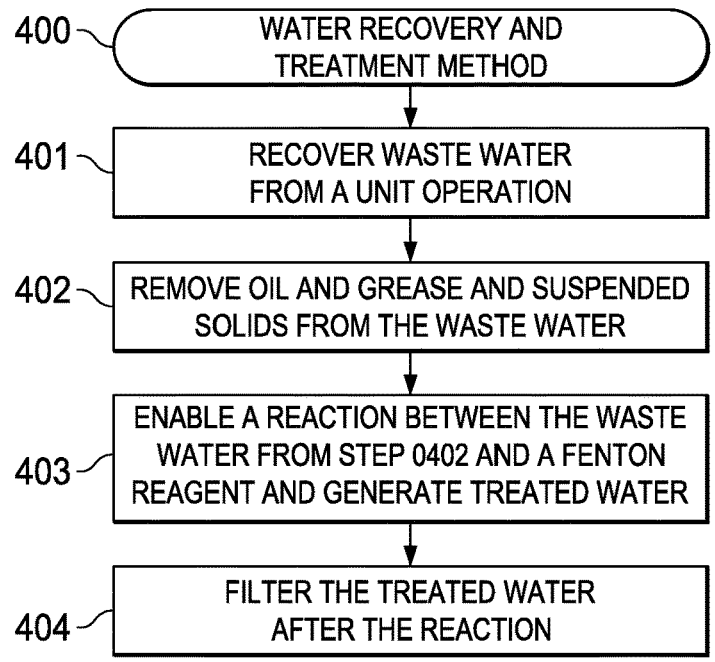
FIGS. 4a and 4b are an exemplary water recovery and treatment process flow chart according to an embodiment of the present invention.
Figure 4B:
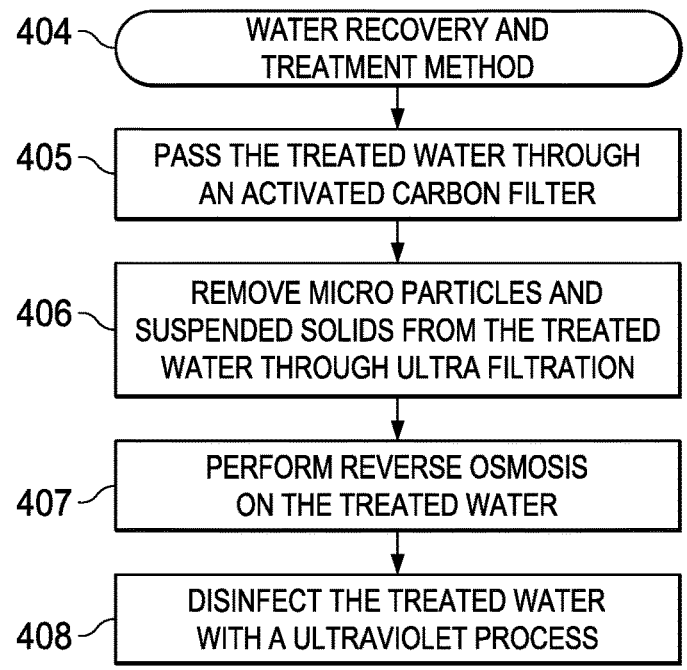

As generally shown in FIGS. 4a and 4b, a method for recovering and treating waste water (400) from a unit operation in a manufacturing process of a food product may be generally described in terms of the following steps:
(1) recovering waste water from a unit operation (401);
The unit operation may be washing, peeling, dehydrating, or the waste water may be taken from a fryer stack directly or after the steam from the fryer is processed through a vapor absorption chiller. The fryer condensate may then be passed through a heat exchanger to reduce the temperature in preparation for the reaction of step (404). According to an exemplary embodiment, the temperature of the condensate after passing through the heat exchanger may range from 25° C. to 30° C.
(2) removing oil and grease from the waste water (402);
The recovered water from step (401) may then be processed through an oil and grease removal unit (320).
(3) enabling a reaction between the waste water from step b) and a Fenton reagent and generating treated water (403); and
A reaction between the waste water from step (402) with a Fenton reagent may oxidize acrylamide in the waste water. According to preferred exemplary embodiment, Fenton reagent is a combination product of reaction between Iron Salts ($FeSO_4$) and $H_2O_2$. According to another preferred exemplary embodiment the concentration of iron salts ($FeSO_4$) may range from 1% to 50%. According to another preferred exemplary embodiment the concentration of iron salts ($FeSO_4$) may range from 1% to 30%. According to another preferred exemplary embodiment the concentration of $H_2O_2$ may range from 10% to 50%. The reaction time may range from 1 minute to 120 minutes according to a more preferred exemplary embodiment. The reaction time may range from 10 minutes to 60 minutes according to a most preferred exemplary embodiment. The acrylamide is oxidized with the hydroxyl radical and therefore the acrylamide levels are reduced in the treated water. The pH of the reaction may range from 3 to 6. The temperature of the reaction may range from 20° C. and 30° C.
(4) filtering the treated water after the reaction (404);
The water after the reaction in step (403) may then be filtered and further processed to remove color, turbidity, micro particles, suspended solids and dissolved solids as illustrated below in steps (405, 406, 407, 408).
The filtering step (404) may be generally described in terms of the following steps:
(5) passing the treated water through an activated carbon filter (405);
(6) removing micro particles and suspended solids from the treated water through ultra filtration (406);

(7) performing reverse osmosis on the treated water (407); and (8) disinfecting the treated water with a ultraviolet process (408);

In one embodiment, a continuous multi-zone fryer can be used. A continuous multi-zone fryer can have two or more hot oil inlets where hot oil is injected after exiting a heat exchanger having an outlet temperature. The condensate from the multi-zone fryer may be recovered and treated with the method aforementioned in FIGS. 4a and 4b and the system of FIG. 3.

FIG. 5 generally illustrates an exemplary water reuse process flow chart according to a preferred embodiment. The steam (103) may be recovered and reused as water (108) in the manufacturing process. For example, in the manufacturing of potato chips, a 20,000 lbs/hr of potatoes (106) may contain 4000 lbs/hr of solids and 16000 lbs/hr. 10% or 1600 lbs/hr of surface water may be added in the washing unit operation (101). The total water that could potentially recovered in 17600 lbs/hr. In a typical process 50 GPM (gallons per minute) of water may be used of which 35 GPM may be recovered from the fryer stack and treated for reuse as water (108) in the manufacturing process. Therefore there is at least a 70% reduction in the water requirement for the manufacturing process. In the instant example the amount of water required in the manufacturing is reduced from 50 GPM to 35 GPM. Other elements and more than 240 parameters in the treated water were analyzed for compliance with potable standards (USEPA,WHO) and reuse water standards.

This invention contemplates combining the teachings herein with regard to various unit operation manipulations in order to achieve a desired acrylamide level in the end treated water. The combinations used depend on the starting product and the desired end product and can be adjusted by one skilled in the art pursuant to the teachings herein. The effect of pH and temperature of the reaction acrylamide with the Fenton Reagent are other factors that may be considered and combined with the teachings herein.

While the invention has been particularly shown and described with reference to one or more embodiments, it will be understood by those skilled in the art that various approaches to the reduction of acrylamide in recovered water may be made without departing from the spirit and scope of this invention. For example, while the process has been disclosed herein with regard to potato products, the process can also be used in processing of food products made from vegetables, corn, barley, wheat, rye, rice, oats, millet, and other starch-based grains. In addition to potato chips, the invention can be used in making corn chips and other types of snack chips, as well as in cereals, cookies, crackers, hard pretzels, breads and rolls, and the breading for breaded meats. In each of these foods, the present invention's method for manipulating one or more unit operations can be combined with other strategies for the reduction of acrylamide in the treated water.

Method Summary

The present invention method anticipates a wide variety of variations in the basic theme of implementation, but can be generalized as a method for recovering and treating waste water from a unit operation in a manufacturing process of a food product, the method comprising the steps of:

a) recovering waste water from the unit operation;

b) removing oil and grease from the waste water;

c) enabling a reaction between the waste water from step b) and a Fenton reagent and generating treated water; and d) filtering the treated water after the reaction.

This general method summary may be augmented by the various elements described herein to produce a wide variety of invention embodiments consistent with this overall design description.

Method Variations

The present invention anticipates a wide variety of variations in the basic theme of recovering and treating waste water from a unit operation. The examples presented previously do not represent the entire scope of possible usages. They are meant to cite a few of the almost limitless possibilities.

This basic system and method may be augmented with a variety of ancillary embodiments, including but not limited to:

An embodiment wherein the Fenton reagent is a product of reaction of Iron Salts and $H_2O_2$.

An embodiment wherein the reaction at step c) further comprises a reaction between hydroxyl radical from the Fenton reagent and phenols in the waste water output from the step b).

An embodiment wherein the reaction at step c) further comprises a reaction between hydroxyl radical from the Fenton reagent and phenolic compounds in the waste water output from the step b).

An embodiment further comprises reaction of Fenton reagent and acrylamide.

An embodiment wherein the acrylamide is oxidized when the acrylamide reacts with the hydroxyl radical.

An embodiment wherein the levels of acrylamide is reduced by at least 99.6% from the levels of the waste water received from the unit operation.

An embodiment wherein the levels of acrylamide is reduced to less than 0.1 ppb.

An embodiment wherein the unit operation is a frying operation and the water from step a) is recovered water from steam in a fryer stack.

An embodiment wherein the unit operation is a washing or peeling operation.

An embodiment wherein the food product is potato chip.

An embodiment wherein the food product is starch based food product.

An embodiment wherein the filtered water from the step d) is reused in the manufacturing process.

An embodiment wherein the reaction at step c) occurs at pH range between 3 and 6.

An embodiment wherein the reaction at step c) occurs at temperature range between 20° C. and 30° C.

An embodiment wherein the reaction at step c) has a reaction time ranging from 10 minutes to 60 minutes.

An embodiment wherein a composition of the Iron Salts ranges from 1% to 30% by volume.

An embodiment wherein a composition of the $H_2O_2$ ranges from 10% to 50% by volume.

An embodiment wherein the treated from step d) has USEPA, WHO potable water standards.

We claim:

1. A method for recovering and treating waste water from a unit operation in a manufacturing process of a food product, said method comprising the steps of:

a) recovering waste water from the unit operation;

b) removing oil and grease from the waste water;

c) enabling a reaction between the waste water from step b) and a Fenton reagent and generating treated water, wherein the reaction comprises reacting the Fenton reagent with acrylamide in the wastewater from step b); and d) filtering the treated water after the reaction to provide filtered water.

2. The method of claim 1 wherein the step d) filtering the treated water comprises the steps of:

e) passing the treated water to an activated carbon filter;

f) removing color, turbidity, micro particles and suspended solids from the treated water through ultra filtration;

g) performing reverse osmosis on the treated water; and h) disinfecting the treated water with an ultraviolet process.

3. The method of claim 1 wherein said Fenton reagent is a product of a reaction of Iron Salts and $H_2O_2$.

4. The method of claim 3 wherein said reaction at step c) further comprises a reaction between hydroxyl radical from said Fenton reagent and phenols in the waste water output from the step b).

5. The method of claim 3 wherein said reaction at step c) further comprises a reaction between hydroxyl radical from said Fenton reagent and phenolic compounds in the waste water output from the step b).

6. The method of claim 1 wherein said acrylamide is oxidized when said acrylamide reacts with hydroxyl radical from said Fenton reagent.

7. The method of claim 6 wherein the level of acrylamide in the filtered water is reduced by at least 99.6% from the level of the waste water received from the unit operation.

8. The method of claim 6 wherein the level of acrylamide in the filtered water is reduced to less than 0.1 ppb.

9. The method of claim 1 wherein said unit operation is a frying operation and said water from step a) is recovered water from steam, wherein the steam is from a fryer stack.

10. The method of claim 1 wherein said unit operation is a washing or peeling operation.

11. The method of claim 1 wherein said food product is a plurality of potato chips.

12. The method of claim 1 wherein said food product is a starch based food product.

13. The method of claim 1 wherein said filtered water from said step d) is reused in said manufacturing process.

14. The method of claim 1 wherein said reaction at step c) occurs at a pH range between 3 and 6.

15. The method of claim 1 wherein said reaction at step c) occurs at a temperature range between 20° C. and 30° C.

16. The method of claim 1 wherein said reaction at step c) has a reaction time ranging from 10 minutes to 60 minutes.

17. The method of claim 3 wherein said Iron Salts are provided in an Iron Salts composition that comprises from 1% to 30% Iron Salts by volume.

18. The method of claim 3 wherein said $H_2O_2$ is provided in an $H_2O_2$ composition that comprises from 10% to 50% $H_2O_2$ by volume.

19. The method of claim 1 wherein the filtered water from step d) meets USEPA or WHO potable water standards as of Jul. 28, 2017.

* * * * *